April 15, 1969     H. D. SULZER     3,438,857
CONTAINMENT VESSEL CONSTRUCTION FOR NUCLEAR POWER REACTORS
Filed March 21, 1967     Sheet _1_ of 5

INVENTOR
HANS D. SULZER

BY Morgan, Finnegan, Durham & Pine
ATTORNEYS

INVENTOR
HANS D. SULZER

United States Patent Office  3,438,857
Patented Apr. 15, 1969

3,438,857
CONTAINMENT VESSEL CONSTRUCTION
FOR NUCLEAR POWER REACTORS
Hans D. Sulzer, Winterthur, Switzerland, assignor to Stone & Webster Engineering Corporation, Boston, Mass., a corporation of Massachusetts
Filed Mar. 21, 1967, Ser. No. 624,829
Int. Cl. G21c 13/10, 11/02
U.S. Cl. 176—37          21 Claims

ABSTRACT OF THE DISCLOSURE

Several structural modifications for containment of water-cooled nuclear power reactors of the pressurized-water type are disclosed. Single and double shell configurations display a combination of structural advantages containing, in addition, chambers for suppression of excessive pressure due to accidental causes by means of condensation of the generated steam and vacuum producing apparatus for reduction of leakage.

This invention relates generally to nuclear reactors and, more particularly, to the constructional features of containment vessels for the housing of such reactors, including safeguards for obtaining suppression of excessive pressure in the event of a nuclear incident.

Nuclear reactor systems of the pressurized water or boiling water types are generally enclosed within a secondary or vapor containment structure designed to withstand the maximum pressure buildup which might be obtained as a result of an accident within the reactor. Such accidents may be due to the rupture of the coolant line or reactor vessel, causing sudden vaporization of the water. There is also the possibility of the release of hydrogen gas due to chemical reaction of the core material and the metal cladding with the high temperature water. It is essential that such gases and vapors be contained within the reactor containment vessel and the pressure reduced so as not to exceed the limits predetermined by the structural design thereof. The safety of nuclear power reactors is based on the principle that in case of an accident accompanied by the release of radioactice fission products, all contaminated gases, liquids, and solids must be contained in a leak-tight vessel until the radioactivity has decreased to acceptable levels.

The most common solution to the problem of containment is to build a vessel around the nuclear reactor and primary coolant system of sufficient volume to hold, under moderate pressure, the flashing coolant escaping out of a major break. This concept of containment leads to very large leak-tight vessels with high material and erection costs. Different means of reducing the size and, therefore, the cost of the containment vessel have been proposed. One of the most promising is the so-called pressure suppression concept which is generally feasible for water-cooled reactors. The pressure suppression containment concept is based on the fact that, following an accident, the pressure of the containment vessel is reduced by quenching the escaping steam and water in a cold water pool located next to the containment vessel.

While such "pressure suppression" technique is well adapted to the boiling water reactor, it has heretofore not been used for pressurized water reactors. This is due to the fact that the pressure suppression scheme requires a high degree of leak-tightness in the containment structure in order to insure that the radioactive fission products which are not dissolved in the pressure suppression pool are not leaked out to the atmosphere. The greatly increased size and volume which would be required for conventional containment structures to house the large heat exchangers associated with the primary coolant system of pressurized water reactors, and which are located above the reactor nozzle level, makes it exceedingly difficult to achieve this degree of leak-tightness with economic practicality.

It is therefore a primary object of this invention to provide a novel containment structure for a nuclear power reactor of the pressurized-water type, which is particularly adaptable for the utilization of the pressure suppression containment technique.

Another object of this invention is to provide a novel containment structure for a nuclear power reactor of the pressurized-water type, which permits the steam generators and primary coolant system components to be entirely enclosed within a single containment shell.

Another object of this invention is to provide a novel containment structure for a nuclear power reactor which includes new and improved means for achieving pressure suppression in the event of a vapor or steam-producing reactor accident.

Another object of this invention is to provide a novel nuclear reactor containment structure which permits a reduction in size and volume and consequent savings in material and labor.

Another object of this invention is to provide a novel nuclear reactor containment structure having increased leak-tightness which results in greater safety of operation.

Another object of the invention is to provide a novel nuclear reactor containment structure which permits the location of the main crane outside the containment structure, whereby use can be made of a standard travelling crane in place of an expensive polar crane required inside of a conventional containment vessel.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention is embodied in a novel containment structure for a nuclear, pressurized-water, power reactor, which includes a containment shell housing the reactor vessel having an upwardly extending dome portion of generally hemispherical configuration and a plurality of satellite compartments extending upwardly from the peripheral surface of the dome. The vertically extending satellite compartments house the steam generators for the reactor, permitting the primary coolant system components to be located completely within the containment shell. This configuration significantly reduces the size and volume of the containment structure, permitting the application of pressure suppression techniques to pressurized-water power reactors with economic practicality.

In a first embodiment of the invention, the containment shell is surrounded by a second shell spaced therefrom, the latter advantageously in turn enclosed by a biological shield. The space between the shells is filled with a porous material, preferably "popcorn" concrete, at least to an extent to form an envelope substantially covering the containment shell. The porous concrete is flooded with water and is connected to the inside of the containment shell by a plurality of conduits, each conduit provided with pressure-responsive closure means. In the event of a reactor accident, the resulting vapor is discharged through the conduits and immediately condensed, thereby achieving pressure suppression.

In other embodiments of the invention, a pressure suppression room is provided within the containment shell; a secondary shell surrounding the containment shell and the space between the shells is at least partially filled with either porous material or reinforced concrete to form an envelope about the inner, containment shell; and, in the double containment embodiments, the space between the shells is advantageously maintained at a negative pressure by means of a pump-back compressor and the space not filled with concrete or porous material is at least partially flooded.

It will be understood that the foregoing general description and the following detailed description as well are exemplary and explanatory of the invention but are not restrictive thereof.

The accompanying drawings, referred to herein and constituting a part hereof, illustrate preferred embodiments of the invention, and together with the description, serve to explain the principles of the invention.

DESCRIPTION OF THE PREFERRED
EMBODIMENTS

Figure 1:
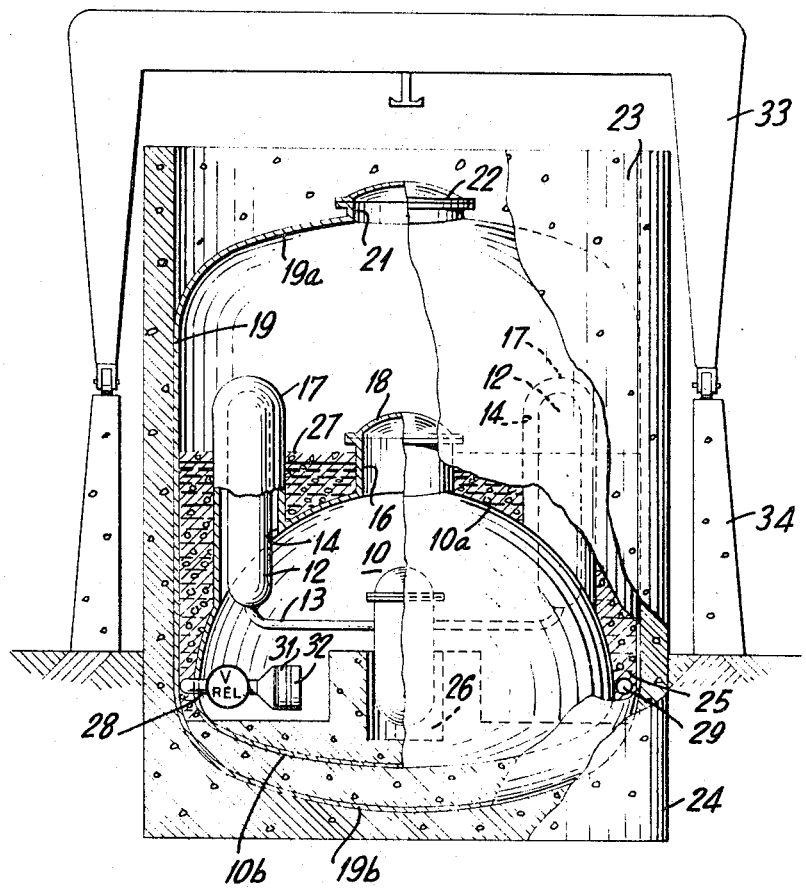
FIGURE 1 is a view in front elevation, partly in section and partly schematic, of a nuclear reactor containment structure in accordance with the invention, embodied in a dual containment design.

Referring now to the accompanying drawings, and more particularly to FIGURE 1 thereof, the containment structure shown comprises a primary inner containment shell 10 adapted to house the reactor vessel 11 and all such equipment associated with the primary coolant system, e.g., the steam generator 12 and piping 13, of a pressurized-water reactor. As here preferably embodied, containment shell 10 has an upwardly extending dome portion 10a of generally hemispherical—i.e., hemispherical or ellipsoidal—configuration and a base portion 10b, advantageously of a generally ellipsoidal configuration. A plurality of satellite compartments, advantageously cylindrical in shape and equispaced from one another, extend vertically upwardly from the peripheral surface of the shell dome 10a, two of such compartments being shown at 14. The vertically-extending satellite compartments 14 house the major portion of the steam generators 12 associated with the reactor and thereby permit containment shell 10 to house both the reactor and primary coolant system components with significantly reduced size and volume over conventional containment structures. In addition, the ellipsoidal bottom 10b serves to further reduce the required overall height for the containment shell.

A centrally located access opening 16 is provided in the dome 10a for the purpose of refueling the reactor. Each of compartments 14 and 16 are provided with suitable coverings 17 and 18, respectively. A cylindrical steel tank 19 forms an outer shell and is of sufficiently larger diameter to completely surround the inner shell 10 and define a space between the two. Advantageously, and as here preferably embodied, the upper and lower heads 19a, 19b of shell 19 are of an ellipsoidal configuration similar to that of base portion 10b of shell 10. A service dome or access opening 21 is provided in the outer shell 19 and is closed by a suitable cover 22.

Advantageously, shells 10 and 19 are imbedded in a cylindrical concrete housing 23 forming a biological shield extending above the top of the outer shell 19. A subterranean portion 24 of the housing 23 provides the base of the assembly. A reinforced concrete structure in the base portion of the inner shell 10 forms a cylindrical wall 26 for the support of the reactor vessel 11.

In accordance with the invention, pressure suppression means is associated with the containment structure for the absorption of steam or vapor produced in the event of a reactor accident.

To that end, in the embodiment illustrated in FIGURE 1, the space between both shells 10 and 19 is filled with a porous material such as gravel, sand, or, perferably, concrete of rough granular structure and of relatively low density. Such concrete is generally referred to in trade parlance as "popcorn" concrete. This material forms an envelope 25 substantially covering the inner shell and terminating in a platform 27 which may conveniently be used for storing auxiliary equipment, such as a small refueling crane for servicing the reactor.

Conduit 28 penetrates the inner shell 10 and terminates in the space filled with the porous material. For the sake of simplicity of illustration, only one such conduit is shown. It is to be understood, however, that several conduits may be placed around the inner wall of the shell 10 for the purpose to be described later. The conduit 28 connects to a horizontal, annular channel 29 in the envelope 25 in order to obtain an even distribution of the vented steam. The porous concrete envelope 25 is flooded with water to a level close to the service platform 27. The conduit 28 is closed by a relief valve (as indicated) which opens only upon an increase in pressure above a predetermined value within the confines of the inner shell 10 to discharge the steam or gases into the flooded concrete envelope 25. A rupture disk 31 set at the design pressure of the primary shell 10 closes the inlet of the relief valve. A charcoal filter 32 is provided upstream of the rupture disk 31.

Outside the reactor structure, there my be provided a travelling crane 33 running on supports 34 for the servicing of the reactor through the access opening 21 in the shell 19.

During normal operation, the water filling the voids of the porous concrete 25 provides an excellent and inexpensive shield and also intensive cooling of the domed surface of the inner shell 10, easing the problem of central ventilation. In addition, the water cools the popcorn concrete, preventing deterioration of its properties by heat, so that it is unnecessary to install imbedded cooling coils as has been the practice heretofore. Furthermore, the positive pressure head maintained by the water layer significantly increases the leak-tightness of the system.

A large proportion of minor accidents is generally due to leaks in the primary cooling system. In the foregoing embodiment of the invention, by virtue of the intensive cooling of the generally hemispherical shell such minor accidents can be kept under control so that considerable pressure may be maintained in the primary container under the rupture criterion of the disk. This will limit the damages from such minor accidents by keeping all steam and released fission products tightly enclosed in the primary shell 10.

In the event of a severe accident such as a surface rupture in the primary coolant system, the pressure will rise rapidly in the primary container. When this pressure exceeds the rupture pressure of the disks, the relief valves open and discharge an air, steam, and water mixture into the flooded space occupied by the porous concrete envelope 25. This discharge will relieve the primary shell 10 and tend to close the relief valves. By this means, the strength of the primary shell is used to its maximum, but never exceeded, and only the minimum of radioactive fission products is released outside the primary container. Contamination of the sealing envelope 25 is also prevented to a large extent by the charcoal filter 32.

In the event of an extreme accident such as perforation of the primary shell 10 and possibly penetration of the porous envelope 25 by a missile with high kinetic energy, the containment system performs its function in a similar manner. Thus, the steam released from a simultaneous break in the main coolant system will build up the pressure inside the primary shell 10 and be blown through the break into the flooded popcorn concrete where it will condense instantaneously. Pressure buildup in the secondary shell 19 is then limited to the flow of non-condensable air and gases into the upper chamber thereof, and the design pressure of the secondary shell is calculated so as to exceed this pressure. Advantageously, a biological shield for the thus contaminated upper chamber may be rapidly obtained by flooding the space above the dome of the secondary shell 19 by means of a suitable pump system, not shown.

Figure 2:
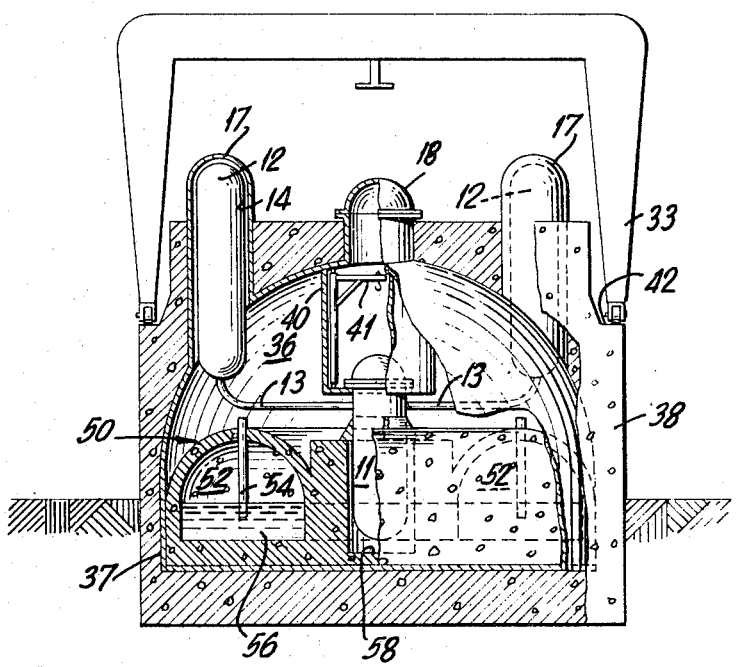
FIGURE 2 is a view in front elevation, partly in section and partly schematic, of a first modified nuclear reactor containment structure in accordance with the invention, embodied in a single containment design.

Referring now more particularly to FIGURE 2 of the accompanying drawings, there is shown a second embodiment of the invention comprising a single containment shell 36 of similar configuration to containment shell 10, except for the base portion 37, here being of a cylindrical shape and having a flat bottom. As in the previous embodiment, shell 36 is provided with a plurality of satellite compartments 14 for housing the steam generators 12 and other associated primary coolant system components entirely therewithin, all in the manner previously described. Other components similar to those in the foregoing embodiment have been designated with the same reference numeral throughout the drawings.

A biological shielding structure 38, advantageously of reinforced concrete and several feet thick, completely surrounds containment shell 36, as well as a major portion of the vertically extending compartments 14.

Below refueling opening 16 in the dome of shell 36 there is an enclosure 40 which extends below the level of the service dome of the reactor vessel 11. The enclosure 40 acts as a service room for storing materials and, since it is under the dome 36, it may be provided with a swinging boom 41 which cooperates in the refueling operation with the travelling crane 33 which may easily be accommodated on a ledge 42 of the shielding structure 38. While not illustrated in each of the figures of the drawings, it will be understood that this service room may advantageously be provided in each of the embodiments of the invention.

In this embodiment of the invention, pressure suppression means are provided inside the lower part of the containment shell and preferably comprise a pressure suppression chamber, indicated generally by reference numeral 50, of a semi-torus configuration, the walls of which define a concentric cavity or chamber 52. This toroidal structure is advantageously made of reinforced concrete. A plurality of vent pipes 54 interconnect the dome 36 with the pressure suppression chamber 52 which is partially filled with condensing liquid 56, such as water. The center of the toroidal structure forms a well 58 in which the reactor vessel 11 may conveniently be located.

The above described arrangement has several important advantages. As in the previous embodiment, the configuration of containment shell 36 significantly reduces the size and volume of the containment shell over conventional containment structures, which represents considerable savings in material and labor. The enclosed pressure suppression chamber in a semi-torous shape with a central recess for the reactor vessel contributes to the reduced size of the containment structure and provides additional leak-tightness and shielding. Also, the main crane 33 can be located outside the containment structure such that a standard travelling crane can be used. In addition, the reactor and steam generators can be conveniently erected even after the concrete structure is completed, and the main steam and feed water penetrations are easily accessible for maintenance and repairs.

Figure 3:
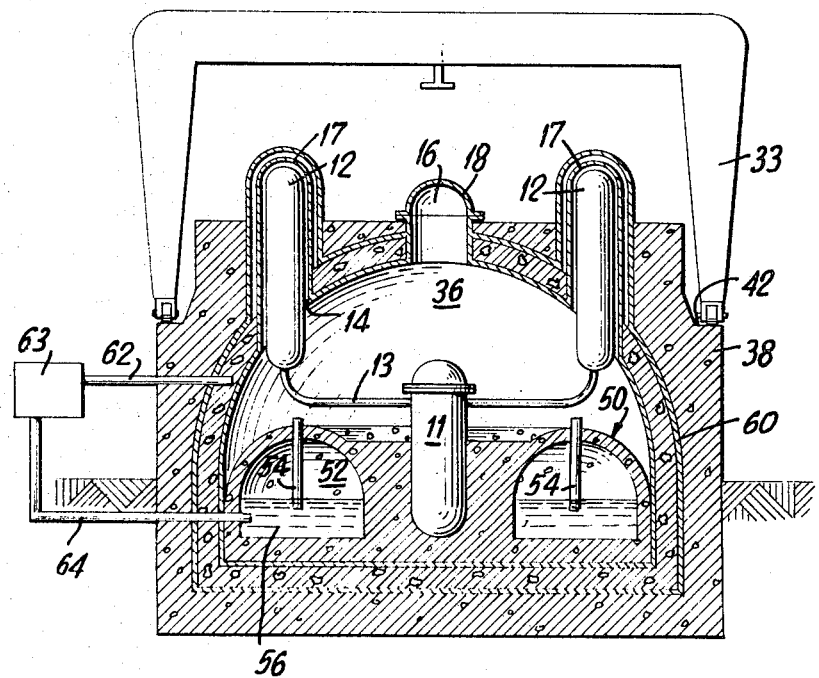
FIGURE 3 is a view in front elevation, partly in section and partly schematic, of a second modified nuclear reactor containment structure in accordance with the invention, illustrating a containment structure having primary and secondary containment shells inside a biological shield.

Referring now to the modified structure shown in FIGURE 3, additional safety is achieved by the use of dual leak-tight containment shells. Thus, a dome-shaped primary shell 36 is provided, of similar construction to that described in connection with FIGURE 2, completely surrounded by a second shell 60 of identical configuration to, but of larger diameter than, shell 36. The space between the shells 36 and 60 may be filled with a porous substance such as popcorn concrete. In this space negative pressure is maintained by the use of piping 62, compressor pump 63, and conduits 64, the latter penetrating into the pressure suppression chamber 52. In all other respects, the constructional details of this structure are the same as the one shown in FIGURE 2 and need not be repeated.

By means of the negative pressure in the space between the walls of shells 36 and 60, leak-tightness is assured during normal operation and an additional leak-tight barrier is provided in case of a rutpure or perforation of the inner shell 36 following an accident.

Figure 4:
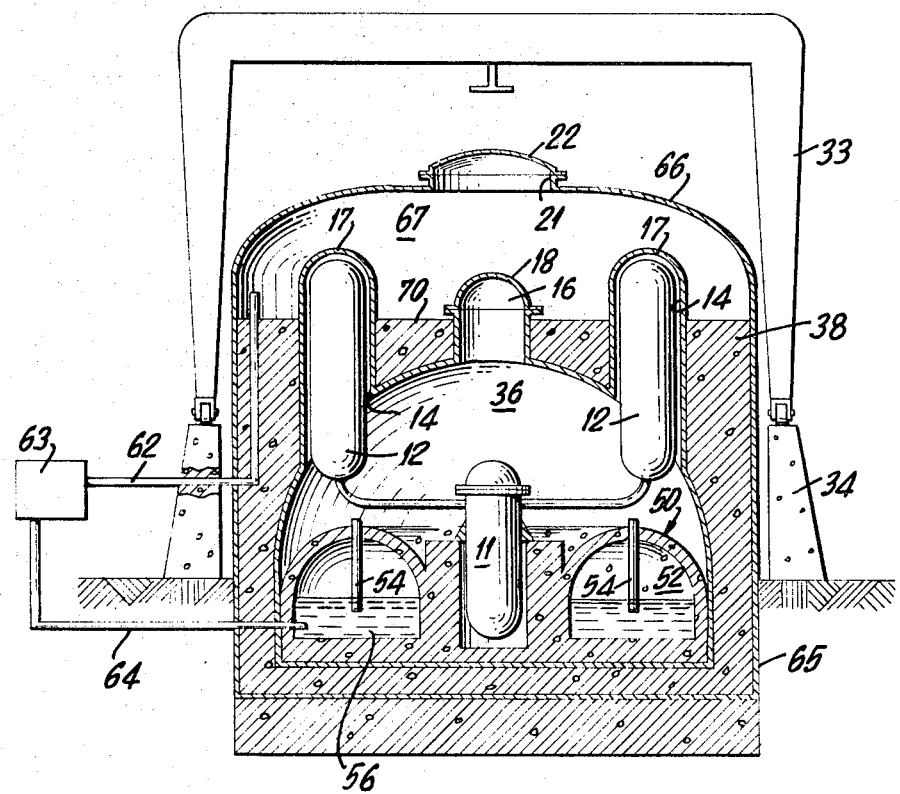
FIGURE 4 is a view in front elevation, partly in section and partly schematic, of a third modified nuclear reactor containment structure in accordance with the invention, illustrating the secondary containment shell surrounding the biological shield.

The modification of the invention shown in FIGURE 4 follows the double containment concept shown in FIGURE 3, except that the secondary containment shell 65 completely surrounds concrete structure 38, within which the inner containment shell 36 is located. Since the inner shell is surrounded by concrete, a great portion of the load resulting from pressure buildup inside the vessel is taken up by the concrete structure 38. The outer shell 65 is provided with a suitable dome-shaped cover 66, having a service opening 21 and a cover 22. The pumpback compressor 63 has inlet piping 62 which extends into the empty space 67 in order to pump back any leaking vapors into the pressure suppression chamber 52 through the conduit 64. The space 67 may conveniently be used for service purposes, the top of the concrete block 38 being used as a service platform 70.

Figure 5:
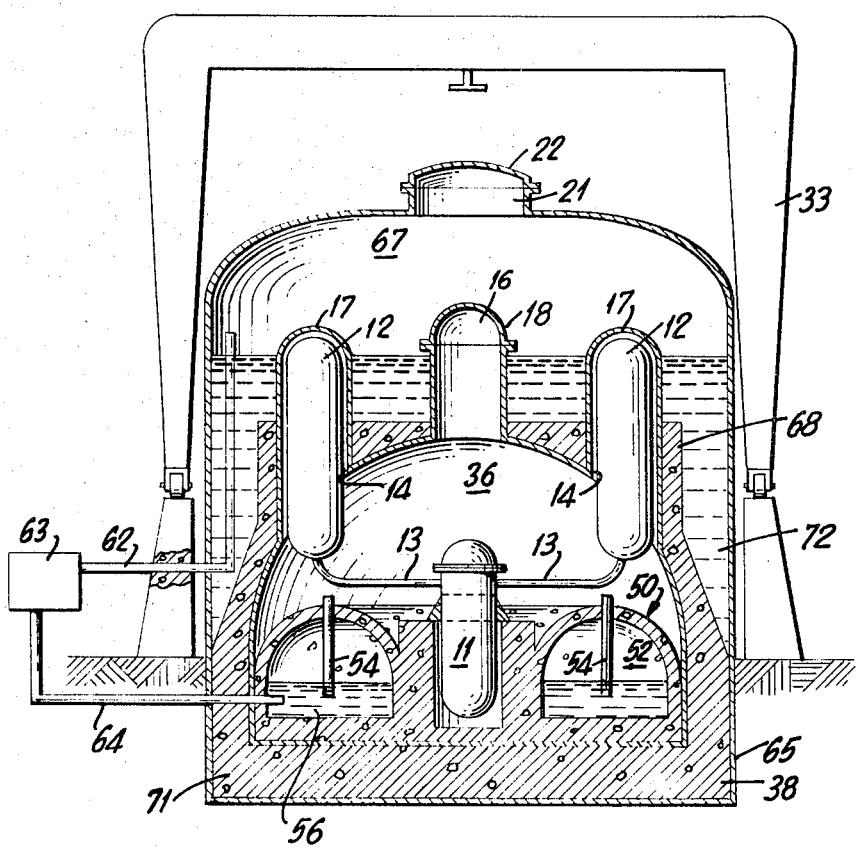
FIGURE 5 is a view in front elevation, partly in section and partly schematic, of a fourth modified nuclear reactor containment structure in accordance with the invention, similar to that of FIGURE 4, including leak suppression means between the secondary containment shell and biological shield.

A further constructional modification in accordance with the invention is shown in FIGURE 5. The structure is identical in most details to that shown in FIGURE 4, except that the upper portion 68 of the concrete block 38 is of reduced diameter, tapering toward the bottom near the subterranean portion 71 of the block 38. The space 72 provided by this construction is filled with water. This construction provides a positive head above the concrete dome which significantly reduces leakage rate during normal operation. It allows easy detection of any significant leakage in the primary container and maintains moisture in the concrete, preventing deterioration of its properties. In case of accident followed by serious leakage from the primary shell 36, the escaping steam will be condensed in the water layer. Consequently the design pressure of the outer shell 61 may be reduced in calculating the stresses thereof. This also allows a reduction in the capacity of the pumpback compressor 63. Moreover, the body of water provides additional cooling and shielding.

The invention in its broader aspects is not limited to the specific embodiments herein shown and described but departures may be made therefrom within the scope of the accompanying claims, without departing from the principles of the invention and without sacrificing its chief advantages.

What is claimed is:

1. In a pressurized-water nuclear power reactor, a containment structure comprising:

a containment shell housing the reactor vessel having an upwardly-extending generally hemispherical dome portion and a plurality of individual compartments entending upwardly from the periphery of said dome;

said individual dome compartments being of substantially identical configuration to that of the steam generators associated with said reactor and of slightly greater over-all dimensions than that of said steam generators so as to house, in closely spaced relation, at least a major portion of said steam generators, whereby primary coolant piping connections between said reactor and associated steam generators are located entirely within said shell;

said containment shell imbedded in a biological shield extending upwardly at least beyond the top of said shell dome portion;

and pressure suppression means associated with said containment structure.

2. A containment structure in accordance with claim 1, wherein said dome compartments are equispaced about the peripheral surface of said dome and each is of a generally cylindrical configuration.

3. In a pressurized-water nuclear power reactor, a containment structure comprising:

a primary inner shell having a generally hemispherical dome portion housing the reactor vessel;

an upwardly-extending secondary outer shell surrounding and supporting said inner shell in spaced relation thereto;

pressure suppression means associated with said containment structure comprising:

a porous material filling the void between the inner surface of said outer shell and the outer surface of said inner shell so as to form an envelope substantially covering said inner shell but terminating beneath the upper end of said outer shell, thereby dividing said outer shell into lower and upper chambers; and said porous envelope being substantially filled with water;

said dome portion of said inner shell having a plurality of compartments extending upwardly therefrom into said upper chamber of said outer shell;

said compartments housing steam generators associated with said reactor, whereby primary coolant piping connections between said reactor and associated steam generators are located entirely within said inner shell;

vapor-conducting conduits interconnecting said inner shell with said porous envelope;

pressure-responsive closure means in said conduits operable upon excess of normal design pressure for opening said conduits and giving access to said porous envelope for the condensation of steam;

and a biological shield surrounding said outer shell.

4. A containment structure in accordance with claim 3 wherein said primary and secondary shells have generally ellipsoidal base portions.

5. A containment structure in accordance with claim 3 wherein said porous material filling said void is concrete of rough granular structure and of relatively low density.

6. A containment structure in accordance with claim 3 wherein the bottom of said outer shell is filled with reinforced concrete forming a mat for the support of said inner shell.

7. A containment structure in accordance with claim 3 wherein said biological shield comprises a cylindrical concrete housing having a base supporting said outer shell and extending upwardly beyond the top thereof.

8. A containment structure in accordance with claim 3 wherein said conduit means comprises a plurality of discharge pipes penetrating the inner shell wall and connecting the flooded porous concrete with the inside of said primary shell.

9. A containment structure in accordance with claim 3 wherein said conduits terminate in a concentrically disposed horizontal channel in said porous envelope for even distribution of the vented steam.

10. A containment structure in accordance with claim 3 wherein said closure means comprises relief valves.

11. A containment structure in accordance with claim 3 wherein said closure means comprises rupture disks.

12. A containment structure in accordance with claim 3 wherein said pressure-responsive closure means comprises rupture disks adjacent radiation filter means.

13. A containment structure in accordance with claim 3 wherein said biological shield includes means supporting the runway of a travelling crane.

14. In a pressurized-water nuclear power reactor, a containment structure comprising:

a containment shell housing the reactor vessel having an upwardly-extending generally hemispherical dome portion and a plurality of compartments extending upwardly from the periphery of said dome;

said compartments housing steam generators associated with said reactor, whereby primary coolant piping connections between said reactor and associated steam generators are located entirely within said shell;

said containment shell imbedded in a biological shield extending upwardly at least beyond the top of said shell dome portion;

and pressure suppression means associated with said containment structure comprising:

a pressure suppression chamber structure located within said containment shell having walls defining a semi-torus and enclosing a concentric cavity, the center of said pressure suppression chamber structure forming a well for the support of said reactor vessel, and a plurality of vent pipes interconnecting said dome with said toroidal cavity and extending therewithin into a condensing liquid partially filling said cavity.

15. A containment structure in accordance with claim 14 wherein:

said containment shell has a cylindrical base portion, said biological shield comprises a cylindrical concrete housing having a base supporting said containment shell and extending upwardly at least beyond the top of said shell dome portion;

and said semi-toroidal chamber is made of reinforced concrete.

16. A containment structure in accordance with claim 14 including:

a second shell of identical configuration enclosing said containment shell and of larger overall dimension thereby defining a space between said shells;

said space being filled with a porous substance;

and conduit means including pump means interconnecting said space with said toroidal cavity for maintaining a negative pressure with reference to said pressure suppression chamber.

17. A containment structure in accordance with claim 16 wherein said porous substance is gravel.

18. A containment structure in accordance with claim 16 wherein said porous substance is sand.

19. A containment structure in accordance with claim 16 wherein said porous substance in concrete of rough granular material and of relatively low density.

20. In a pressurized-water nuclear power reactor, a containment structure comprising:

a containment shell housing the reactor vessel having an upwardly-extending generally hemispherical dome portion and a plurality of compartments extending upwardly from the periphery of said dome;

said compartments housing steam generators associated with said reactor, whereby primary coolant piping connections between said reactor and associated steam generators are located entirely within said shell;

pressure suppression means associated with said containment structure comprising:

a pressure suppression chamber structure located within said containment shell having walls defining a semi-torus and enclosing a concentric cavity, the center of said pressure suppression chamber structure forming a well for the support of said reactor vessel, and a plurality of vent pipes interconnecting said dome with said toroidal cavity and extending therewithin into a condensing liquid partially filling said cavity;

said containment shell being imbedded in a biological shield extending upwardly beyond the top of said shell dome portion but below the upper ends of said steam generator housing compartments;

a second outer shell surrounding said biological shield and extending upwardly above said compartment structures;

and conduit means including pump means interconnecting said space with said toroidal cavity for maintaining a negative pressure in said space with respect to said pressure suppression chamber.

21. A containment structure in accordance with claim 20 wherein said biological shield is recessed from said outer shell and is of reduced height providing a space between the inner wall of the outer shell and the outer wall of said biological shield, and said space is filled with a liquid sealing medium.

References Cited

UNITED STATES PATENTS

| | | | |
|---|---|---|---|
| 3,158,546 | 11/1964 | Cordova | 176—37 |
| 3,192,121 | 6/1965 | Challender et al. | 176—37 X |
| 3,320,969 | 5/1967 | Gordon | 176—87 X |
| 3,234,102 | 2/1966 | Brown et al. | 176—87 |
| 3,258,403 | 6/1966 | Malay | 176—37 |
| 3,287,226 | 11/1966 | Webb | 176—37 |
| 3,301,761 | 1/1967 | Johnson et al. | 176—37 |

FOREIGN PATENTS 878,940   10/1961   Great Britain.

REUBEN EPSTEIN, *Primary Examiner.*

U.S. Cl. X.R.

176—87